United States Patent [19]

Janich

[11] 4,398,697

[45] Aug. 16, 1983

[54] PIVOTAL FLAP

[76] Inventor: Hans-Jurgen Janich, Regelkamp 12, D-4720 Beckum, Fed. Rep. of Germany

[21] Appl. No.: 266,510

[22] Filed: May 22, 1981

[30] Foreign Application Priority Data

Jun. 19, 1980 [DE] Fed. Rep. of Germany ....... 3022862

[51] Int. Cl.³ .............................................. F16K 1/22
[52] U.S. Cl. ................................................. 251/308
[58] Field of Search ....................... 251/305, 306, 308; 137/601

[56] References Cited

U.S. PATENT DOCUMENTS

| 1,858,587 | 5/1932 | Grant | 251/306 |
| 2,054,064 | 9/1936 | Anderson | 251/306 |
| 2,789,785 | 4/1957 | Woods | 251/306 |
| 3,030,069 | 4/1962 | Cummins | 251/308 |
| 3,457,849 | 7/1969 | Hinden | 251/305 |
| 4,253,641 | 3/1981 | Van Ryck | 251/306 |

FOREIGN PATENT DOCUMENTS

| 543914 | 7/1957 | Canada | 251/306 |
| 1236709 | 3/1967 | Fed. Rep. of Germany | 251/306 |
| 1242960 | 6/1967 | Fed. Rep. of Germany | 251/306 |
| 2158634 | 6/1973 | Fed. Rep. of Germany | 251/306 |
| 2346784 | 10/1974 | Fed. Rep. of Germany | 251/305 |
| 1081931 | 12/1954 | France | 251/308 |
| 198480 | 9/1938 | Switzerland | 251/308 |
| 873408 | 7/1961 | United Kingdom | 251/306 |
| 1104759 | 2/1968 | United Kingdom | 251/305 |

Primary Examiner—Martin P. Schwadron
Assistant Examiner—John A. Rivell
Attorney, Agent, or Firm—Learman & McCulloch

[57] ABSTRACT

The invention relates to a pivotal shut-off and control flap of which the central section (1) comprises an elongate shell (3) which at its two ends is fixedly connected to shaft elements (4) through hub members (6), provision being made for a limited relative movement between the shell and the vane section (2). In an arrangement such as this, the vane section does not undergo excessive deformation, even in the event of severe temperature stressing on one side. The torque required for operating the flap is uniformly transmitted to the vane section.

11 Claims, 9 Drawing Figures

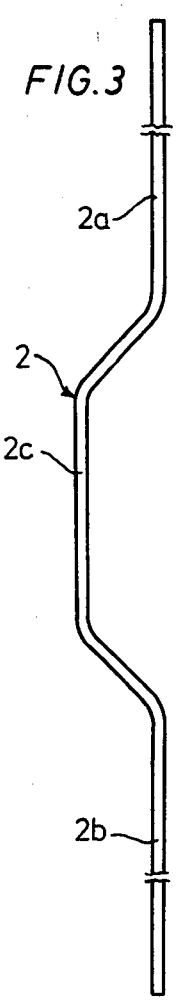
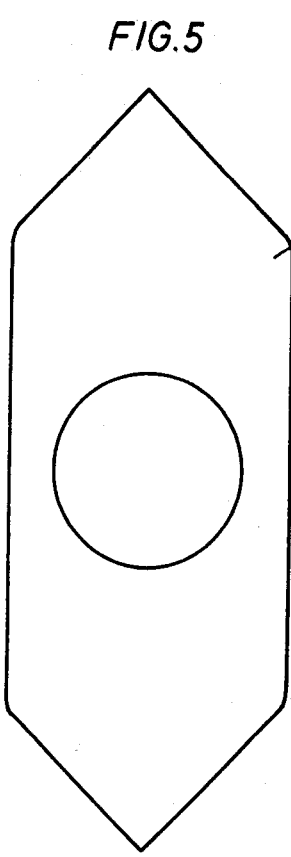
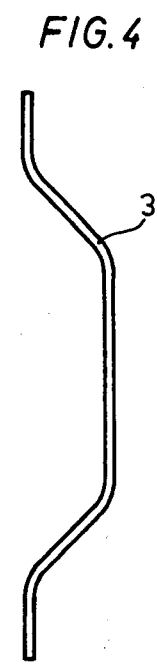
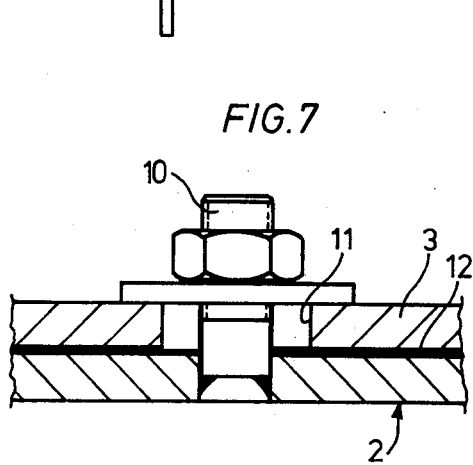
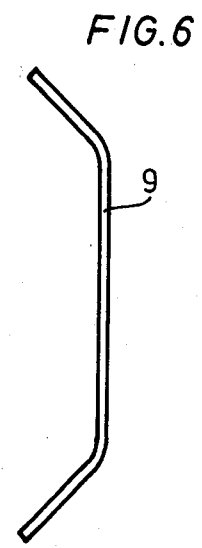

PIVOTAL FLAP

This invention relates to a pivotal shut-off control flap, more particularly for large hot-gas pipes, which is of considerable length in the direction of its pivoting axis and which comprises a central part provided with at least one shaft element for mounting the flap and for transmitting the flap torque and a vane section which forms the two vanes of the flap and which is mounted for limited movement relative to the central section in the longitudinal direction of the flap.

Flaps installed in hot-gas pipes undergo severe temperature stressing in operation. Where large dimensions are involved, this can give rise to considerable thermal expansion.

In order to avoid leaks attributable to deformation of the flap vanes, flaps have already been developed of which the shaft is mounted for limited axial movement in the housing and is kept centred in the flap housing by means of springs (German Utility Model No. 71 16 334.3). With a floating arrangement such as this, the flap vane is able to expand uniformly in all directions. However, problems arise out of the fact that, particularly when the flap is in its closed position, the flap shaft or rather the hub tube on the one hand and the flap vane on the other hand expand to different extents which can give rise to distortion.

For this reason, a pivotal shut-off and control flap has also been developed in which the vanes are mounted for longitudinal displacement on the shaft (German Pat. No. 22 49 727). In this case, the vanes are offset relative to the shaft and are actuated through drivers. In this case, however, power is for the most part locally transmitted from the shaft to the vanes rather than uniformly over the entire length of the shaft, resulting in the application of different closing forces to the individual vanes. Another disadvantage lies in the fact that a vane arrangement of the type in question can only be sealed by means of sealing cones which have to be able to equalise the overall expansion of the vane. Because of this, the vanes of flaps of the type in question are limited in their dimensions. On the other hand, small vanes in large pipes necessitate intermediate mounting of the shafts at regular intervals. The bearings used are inaccessible in the pipe and are exposed to the hot gases which frequently contain dust. Finally, this known arrangement also involves the danger of deposits forming on the shaft with the attendant risk of the vanes seizing on the shaft. The danger is greater insofar as the sliding fit between the shaft and the vane is constantly exposed to attack by the dust-laden hot gases.

Another known pivotal flap is essentially formed by a shaft and a vane section which encloses the shaft and which consists of two metal plates which, at their centre, are separated from one another by a distance corresponding to the diameter of the shaft and which converge towards the edges of the vane section. In this case, the shaft is only fixedly connected to the vane section at its end by means of a bolt, the remaining connections along the shaft being established by means of threaded bolts which project through slots. As a result, the shaft and the vane section are able to expand independently of one another in the longitudinal direction in operation.

However, this arrangement is also attended by serious disadvantages. Power is transmitted from the shaft to the vane section of the flap through the above-mentioned bolts, i.e. largely locally, giving rise to intense shearing forces. In addition, the vane section has little elasticity on account of its described construction, giving rise to leaks, particularly where the pipe and the flap have large dimensions and in the event of temperature-induced deformation.

Accordingly, the object of the present invention is to avoid the deficiences of the known constructions discussed in the foregoing by developing a pivotal shut-off and control flap which in particular satisfies the following requirements:

the vane section is required to undergo minimal deformation, even in the event of severe one-sided temperature stressing;

in order to make up for certain unavoidable deflections, the vane section is required to show adequate elasticity;

the torque required for operating the flap (and particularly for generating the closing pressure) is required to be transmitted from the shaft element(s) to the vane section uniformly over the entire length of the flap without any local stressing;

finally, the vane section—in its closed position—is required to be satisfactorily sealable up to the shaft.

According to the invention, this object is achieved in that the central section comprises at least one elongate shell in the form of a distortion-resistant shaped element which surrounds the shaft element(s) at a distance on one wide side of the flap, is fixedly connected at both ends to the shaft element(s) through hub members and, in the region of the longitudinal edges of the shell, is connected to the vane section by connecting elements which provide for a limited relative movement between the shell and the vane section.

In the flap according to the invention, the critical zones on the one hand of torque transmission from the shaft to the vane and, on the other hand, the longitudinal displaceability between the shaft and the vane are spatially separated from one another. The torque is transmitted from the shaft element(s) (i.e. either from a single shaft or from two shaft stubs) through hub members and proven structural elements (for example a feather key) to the elongate shell of the central section which is formed by a distortion-resistant shaped element. The further transmission of the torque from this shell to the vane section occurs in the region of the longitudinal edges of the shell, i.e. at a fairly considerable distance from the axis of the shaft (and hence with a favourable moment arm). In this connection, it is favourable that the connecting elements which provide for limited relative movement between the shell and the vane section are only moderately stressed by virtue of their arrangement in the region of the longitudinal edges of the shell.

Another particular advantage of the flap according to the invention lies in the combination of the high distortion resistance of the central section with the high elasticity of the vane section. By virtue of this combination, the torque applied for operating the flap is uniformly transmitted to the vane section over the entire length of the flap and, at the same time, the highly elastic vane section is effectively adapted to the stationary sealing surface. This high rigidity of the central section coupled with the high elasticity of the vane section is of considerable importance above all where the vane section is of considerable length for large hot-gas pipes.

The shaft of the flap according to the invention is largely protected against attack by dust-laden hot gases by the central section formed by the elongate shell. In this connection, it is of particular advantage that, by virtue of the high resistance of the central section to bending and distortion, there is no need for intermediate mounting even with flaps of very considerable length, thus eliminating all the problems involved in maintaining substantially inaccessible intermediate bearings exposed to heavy wear.

These and other features of the invention will become apparent from the following description of preferred embodiments illustrated in the accompanying drawings, wherein:

FIGS. 3 to 6 show individual parts of the flap illustrated in FIGS. 1 and 2.

FIG. 7 is a section through the connection between the shell and the vane section.

Figure 1:
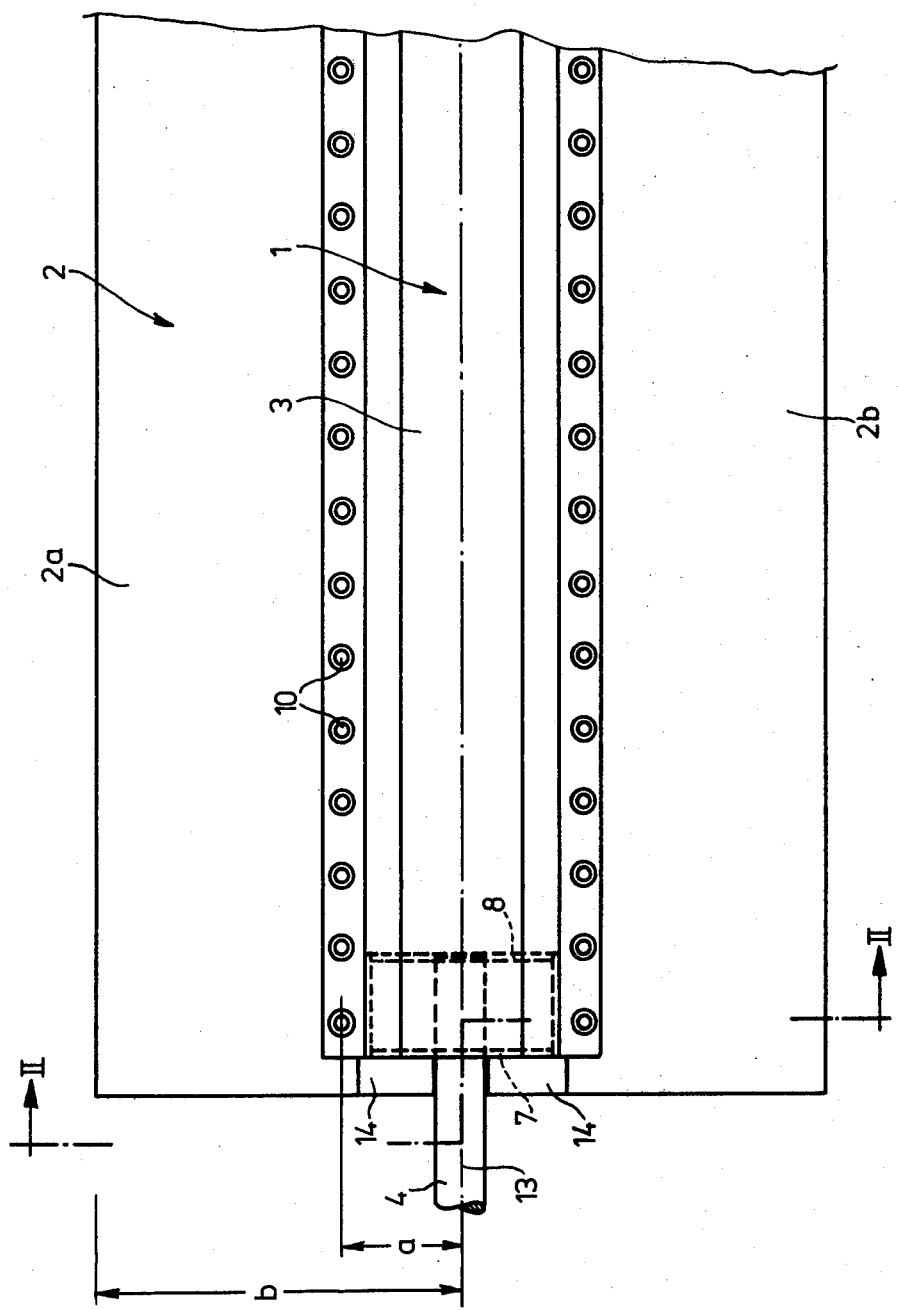
FIG. 1 is a plan view of a first embodiment of a flap according to the invention.
Figure 2:
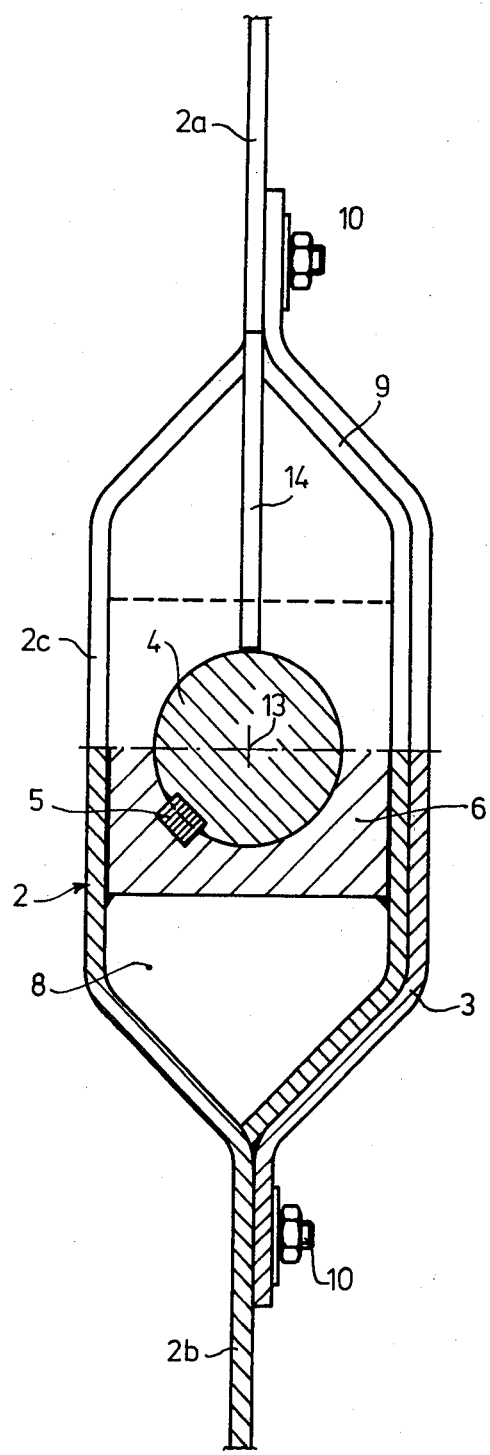
FIG. 2 is a section on the line II—II in FIG. 1.

The pivotal shut-off and control flap shown in FIGS. 1 to 7, which is intended in particular for large hot-gas pipes, comprises a central section 1 for mounting the flap and for transmitting the flap torque and a vane section 2 forming the two vanes 2a and 2b.

The central section 1 comprises an elongate shell 3 which is formed by a distortion-resistant shaped, dished plate element and which—in the same way as the vane section 2—extends virtually over the entire length of the flap.

The vane section 2 is also shell-like at its centre 2c and, through this shell-like region 2c, makes the central section 3 into a coherent, hollow element.

Two shaft stubs 4 provided at the ends of the flap are used for the pivotal mounting and for initiating the flap torque, being fixedly connected to a hub member 6 through a feather key 5. The hub member 6 is welded to the vane section 2 through two gusset plates 7 and 8.

In the region of the hub member 6, there is another shell-like plate 9 which is welded to the hub member 6 and to the gusset plates 7 and 8.

In the region of its longitudinal edges, the elongate shell 3 of the central section 1 is connected to the vane section 2 by threaded bolts 10 which project through slots 11 in the shell 3. These slots 11 extend in the longitudinal direction of the flap so that, in the event of differential thermal expansion, they provide for a limited relative movement between the vane section 2 and the shell 3 in the longitudinal direction of the flap. A low-friction plastics film 12 is arranged between the shell 3 and the vane section 2.

The distance a separating the threaded bolts 10 (as connecting elements between the vane section 2 and the shell 3) from the pivoting axis 13 corresponds to between 0.25 and 0.5 times and preferably to between 0.3 and 0.4 times half the width b of the flap. This value has proved to be optimal for obtaining on the one hand the required high resistance to bending and distortion of the central hollow body used for transmitting power and, on the other hand, the required elasticity of the vanes 2a and 2b of the vane section 2.

Since the vane section 2 is slightly longer than the central section 1, fillers 14 are provided in the region lying outside the hub member 6, being welded to the vane section 2 and extending the vane section to the shaft stub 4. In this way, the pipe can also be shut off in the region between the hub member 6 and the flap housing (not shown).

Figure 8:
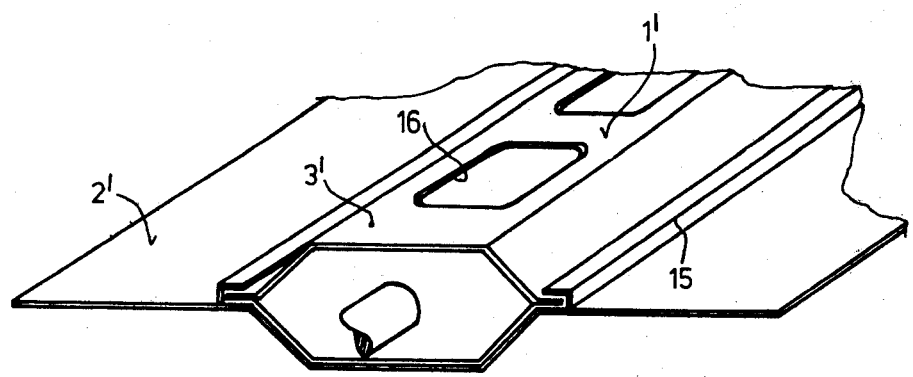
FIG. 8 is a perspective view of another embodiment.

FIG. 8 shows another embodiment in which the elongate shell 3' of the central section 1' is connected to the vane section 2' through a low-friction guide 15. A connection such as this also provides for a limited relative movement between the central section 1' and the vane section 2' in cases where these two components undergo thermal expansion to different extents. In this embodiment, the shell 3' of the central section 1' is provided with ventilation openings 16 which, at very high temperatures, provide for a more effective dissipation of heat from the central section of the flap.

Figure 9:
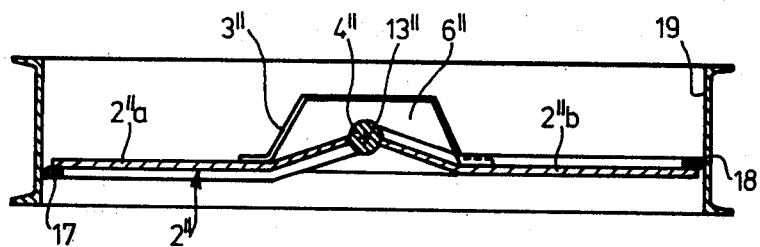
FIG. 9 is a section through another variant.

Whereas in the embodiments described above the pivoting axis (for example 13, cf. FIGS. 1 and 2) lies in the plane of the two vanes (for example 2a, 2b), FIG. 9 shows an embodiment in which the pivoting axis 13" is offset in relation to the plane of the two vanes 2"a, 2"b (shaft 4" eccentrically arranged). In this case, the vane section 2" is angled downwards at its centre towards the pivoting axis 13".

As in the embodiments described above, the elongate shell 3" surrounds the shaft 4" at a distance and is fixedly connected to the shaft at its two ends through hub members 6". In the region of the longitudinal edges of the shell, there is a connection between the shell 3" and the vane section 2" which provides for a limited relative movement in the longitudinal direction of the flap. In this embodiment, the distortion-resistant hollow shaped element which forms the central section of the flap is formed by a single shell 3" and by the inwardly angled part of the vane section 2".

In FIG. 9, the seals for the vane section 2" are denoted by the references 17 and 18 and the flap housing by the reference 19.

I claim:

1. A rectilinear, pivotal shutoff control flap adapted for use in large, hot gas pipes comprises at least one mounting shaft rotatable about an axis; a pair of elongate vane sections extending longitudinally of said shaft and on opposite sides of said axis; and means connecting said vane sections to said shaft, said connecting means comprising at least one hub member fixed to said shaft, an elongate shell member carried by said hub member and extending longitudinally of said shaft, said shell member being of distortion resistant shape having opposite ends extending on opposite sides of said axis toward said vane sections and having a central section spaced transversely to one side of said axis and said shaft, and means coupling the opposite ends of said shell member to respective ones of said vane sections and enabling limited relative movement therebetween longitudinally of said shaft.

2. A flap according to claim 1 wherein said shell member comprises a hollow member enclosing said shaft.

3. A flap according to claim 1 wherein said shell member comprises an elongate plate and wherein said central section is dished to one side of said shaft.

4. A flap according to claim 1 wherein said vane sections are coplanar with each other and with said axis.

5. A flap according to claim 1 wherein said vane sections are coplanar with each other and offset to one side of said axis.

6. A flap according to claim 1 wherein said connecting means includes a number of gusset plates secured to said shell member and to said hub member.

7. A flap according to claim 1 wherein said coupling means comprises a plurality of bolts and wherein each of said vane sections has slots in which said bolts are accommodated, said slots extending in the longitudinal direction of said vane sections.

8. A flap according to claim 1 wherein said vane sections are longer than and project beyond said shell member, and including fillers extending between those portions of said vane sections which project beyond said shell member.

9. A flap according to claim 1 wherein said coupling means comprises low friction means.

10. A flap according to claim 1 wherein said shell member is provided with spaced apart ventilation openings along its length.

11. A flap according to claim 1 wherein the distance transversely of said flap between the coupling means of each of said vane sections and said axis is between 0.25 and 0.5 times the transverse width of said flap.

* * * * *